United States Patent
Juels

(10) Patent No.: US 6,446,052 B1
(45) Date of Patent: *Sep. 3, 2002

(54) DIGITAL COIN TRACING USING TRUSTEE TOKENS

(75) Inventor: Ari Juels, Cambridge, MA (US)

(73) Assignee: RSA Security Inc., Bedford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 71 days.

(21) Appl. No.: 09/195,527

(22) Filed: Nov. 18, 1998

Related U.S. Application Data

(60) Provisional application No. 60/066,137, filed on Nov. 19, 1997.

(51) Int. Cl.$^7$ ................................................ G06F 17/60
(52) U.S. Cl. ............................................ 705/69; 705/74
(58) Field of Search ............................... 705/1, 50, 64, 705/67, 69, 74; 380/1, 24, 28, 30

(56) References Cited

U.S. PATENT DOCUMENTS

| | | | |
|---|---|---|---|
| 4,529,870 A | 7/1985 | Chaum | 235/380 |
| 4,759,063 A | 7/1988 | Chaum | 380/30 |
| 4,759,064 A | 7/1988 | Chaum | 380/30 |
| 4,914,698 A | 4/1990 | Chaum | 380/30 |
| 4,926,480 A | 5/1990 | Chaum | 380/23 |
| 4,947,430 A | 8/1990 | Chaum | 380/25 |
| 4,949,380 A | 8/1990 | Chaum | 380/30 |
| 4,987,593 A | 1/1991 | Chaum | 380/3 |

(List continued on next page.)

FOREIGN PATENT DOCUMENTS

| | | | |
|---|---|---|---|
| EP | 0 755 136 A2 | 1/1997 | H04L/9/32 |
| EP | 0 772 165 A3 | 5/1997 | |
| WO | WO 95/22215 | 8/1995 | H04L/9/00 |

OTHER PUBLICATIONS

Jakobsson et al., "Distributed 'Magic Ink' Signatures" Proceedings of Eurocrypt May 15, 1997 p. 1–15.*
Jakobsson, "Distrubuted 'Magic Ink' Signatures" Eurocrypt, May 15, 1997.*
Camenisch, J. et al. "Fair Anonyme Zahlungssysteme," *Informatik Aktuell*, Sep. 1995, pp. 254–265. (with English translation).

(List continued on next page.)

Primary Examiner—Melanie A. Kemper
(74) Attorney, Agent, or Firm—Testa, Hurwitz & Thibeault, LLP

(57) ABSTRACT

A system and method for obtaining traceable anonymous digital cash from a bank using a trustee as a trusted third-party. A user establishes her identity with the trustee using a secret known by the user. The user transmits to the trustee information describing a blinded traceable digital coin. The user receives from the trustee a trustee token including a signature by the trustee on the blinded coin. The user transmits the blinded coin and the trustee token to a bank. The user receives a signature from the bank certifying the blinded coin. The user can then unblind the coin, and spend the coin at a merchant. The system and method support both tracing of the identity of a user from a coin, referred to as coin tracing, and generation of a list of all coins belonging to a given user, referred to as owner tracing. Both of these operations require very little computation and database access. To determine the identity of the user, the trustee can generate the list of coins associated with a user. Alternatively, if presented with a coin, the trustee can determine the identity of the user who submitted the coin to the trustee for signature. This simple and highly efficient trustee-based tracing system and method can be added on top of anonymous cash schemes based on blind RSA signatures.

31 Claims, 5 Drawing Sheets

U.S. PATENT DOCUMENTS

| | | | |
|---|---|---|---|
| 4,991,210 A | 2/1991 | Chaum | 380/30 |
| 4,996,711 A | 2/1991 | Chaum | 380/30 |
| 5,131,039 A | 7/1992 | Chaum | 380/23 |
| 5,276,736 A | 1/1994 | Chaum | 380/24 |
| 5,373,558 A | 12/1994 | Chaum | 380/23 |
| 5,434,919 A | 7/1995 | Chaum | 380/30 |
| 5,485,520 A | 1/1996 | Chaum et al. | 380/24 |
| 5,493,614 A | 2/1996 | Chaum | 380/30 |
| 5,511,121 A | 4/1996 | Yacobi | 380/24 |
| 5,712,913 A | 1/1998 | Chaum | 380/24 |
| 5,790,677 A * | 8/1998 | Fox et al. | 380/24 |
| 5,832,089 A | 11/1998 | Kravitz et al. | 380/24 |
| 6,014,646 A * | 1/2000 | Vallee et al. | 705/39 |

OTHER PUBLICATIONS

Camenisch, J. et al. "Blind Signatures Based on the Discrete Logarithm Problem," *Advances in Crypology—EUROCRYPT '94*, vol. 950 of LNCS, 1995, pp. 428–432.

Camenisch, J. et al. "An Efficient Electronic Payment System Protecting Privacy," *Computer Security—ESORICS 94*, vol. 875 of LNCS, 1994, pp. 207–215.

Stadler, M. "Publicly Verifiable Secret Sharing," *Advances in Cryptology—EUROCRYPT '96*, vol. 1070 of LNCS, 1996, pp. 190–199.

European Patent Office, European Search Report, Application No. PCT/US98/24597, mailed on May 5, 1999, 7 pages.

Chaum, D. "Blind Signatures for Untraceable Payments," in *Advances in Cryptology—CRYPTO '82*, 1983, pp. 199–203.

Chaum, D. "Privacy Protected Payments: Unconditional Payer and/or Payee Untraceability," in *Smart Card 2000*, North Holland, 1989, pp. 69–93.

Chaum, D. "Security Without Identification: Transaction Systems to Make Big Brother Obsolete," in *Communications of the ACM*, Oct. 1985, 28(10), pp. 1030–1044.

Chaum, D. et al. "Untraceable Electronic Cash," in *Advances in Cryptology—CRYPTO '88*, vol. 403 of LNCS, 1990, pp. 319–327.

M'Raihi, D. "Cost–Effective Payment Schemes with Privacy Regulation," in *Advances in Cryptology—Proceedings of ASIACRYPT '96*, vol. 1163 of LNCS, 1996, pp. 266–275.

Pfitzmann, B. and Waidner, M. "How to Break and Repair a "Provably Secure" Untraceable Payment System," in *Advances in Cryptology—Proceedings of Crypto '91*, 1992, pp. 338–350.

Rabin, T. "A Simplified Approach to Threshold and Proactive RSA," in *Advances in Cryptology—CRYPTO '98*, vol. 1462 of LNCS, 1998, pp. 89–104.

von Solms, S. and Naccache, D. "On Blind Signatures and Perfect Crimes," in *Computers and Security*, 1992, 11(6), pp. 581–583.

Jackobsson, M. et al. "Distributed Magic–Ink Signatures," *Advances in Cryptology—EUROCRYPT '97*, pp. 450–464, Springer–Verlag, 1997, LNCS No. 1233.

Jackobsson, M. et al. "X–Cash: Executable Digital Cash," *Financial Cryptography '98*, Springer–Verlag, 1998.

Juels, Ari. et al. "Security of Blind Digital Signatures," *Advances in Cryptology—CRYPTO '97*, pp. 150–164, Springer–Verlag, 1997. LNCS No. 1294.

Law, L. et al. "How to Make a Mint: The Cryptography of Anonymous Digital Cash," *Technical Report 96–10–17, National Security Agency, 1996*. Available at http://jya.com/nsamint.htm, downloaded Dec. 28, 1998.

M'Raihi, D. et al. "Distributed Trustees and Revocability: A Framework for Internet Payment," *Financial Cryptography '98*. Springer–Verlag, 1998. LNCS No. 1465.

Pointcheval, D. et al. "Provable Secure Blind Signature Schemes," *Advances in Cryptology—Proceedings of ASIACRYPT '96*, pp. 252–265, Springer–Verlag, 1996. LNCS No. 1163.

Schoenmakers, B. "Basic Security of the Ecash™ Payment System," *Computer Security and Industrial Cryptography: State of the Art and Evolution, ESAT Course*, 1997.

Stadler, M. et al. "Fair Blind Signatures," *Advances in Cryptology—EUROCRYPT '95*, pp. 209–219, Springer–Verlag, 1995. LNCS No. 921.

Bellare, M. et al. "Keying Hash Functions for Message Authentication," *Advances in Cryptology—CRYPTO '96*, pp. 1–16, Springer–Verlag, 1996, LNCS No. 1109.

Bellare, M. et al. "XOR MACs: New Methods for Message Authentication Using Finite Pseudorandom Functions," *Advances in Cryptology—CRYPTO '95*, pp. 15–28, Springer–Verlag, 1995. LNCS No. 963.

Boneh, D. et al. "Efficient Generation of Shared RSA Keys," *Advances in Cryptology—CRYPTO '97*, pp. 425–439, Springer–Verlag, 1997. LNCS No. 1294.

Brands, S. "Untraceable Off–Line Cash in Wallet With Observers," *Advances in Cryptology—CRYPTO '93*, pp. 302–331, 1993.

Brickell, E.F. et al. "Trustee–Based Tracing Extensions to Anonymous Cash and the Making of Anonymous Change," *Proceedings of the Sixth Annual ACM–SIAM Symposium on Discrete Algorithms*, pp. 457–466, 1995.

Camenisch, J. et al. "Digital Payment Systems with Passive Anonymith–Revoking Trustees," *Computer Security—ESORICS '96*, pp. 31–43, Springer–Verlag, 1996. LNCS No. 1146.

Camenisch, J. et al. "Digital Payment Systems with Passive Anonymity–Revoking Trustees," *Journal of Computer Security*, 5(1):254–265, 1997.

Camenisch, J. et al. "An Efficient Fair Payment System," *3rd ACM Conference on Computer Communications Security*, pp. 88–94, ACM Press, 1996.

Chaum, D. et al. "Wallet Databases with Observers," *Advances in Cryptology—CRYPTO '92*, pp. 89–105, Springer–Verlag, 1992. LNCS No. 740.

Davida, G. et al. "Anonymity Control in E–Cash Systems," *Financial Cryptography '97*, pp. 1–16, Springer–Verlag, 1997. LNCS No. 1318.

Digicash, Inc. Web site: http://www.digicash.com/ecash/works, downloaded Dec. 28, 1998.

Frankel, Y. et al. "'Indirect Discourse Proofs': Achieving Efficient Fair Off–Line E–Cash," *Advanced in Cryptology—Proceedings of ASIACRYPT '96*, pp. 286–300, Springer–Verlag, 1996. LNCS No. 1163.

Jackobsson, M. et al. "Applying Anti–Trust Policies to Increase Trust in a Versatile E–Money System," *Financial Cryptograpy '97*, pp. 217–238, Springer–Verlag, 1997, LNCS No. 1318.

Jackobsson, M. et al. "Revokable and Versatile Electronic Money," *3rd ACM Conference on Computer Communications Security*, ACM Press, 1996.

* cited by examiner

DIGITAL COIN TRACING USING TRUSTEE TOKENS

CROSS-REFERENCE TO RELATED APPLICATION

This application claims priority to U.S. provisional patent application serial No. 60/066,137 filed Nov. 19, 1997.

TECHNICAL FIELD

This invention relates to the field of electronic commerce transaction systems and, more particularly, to the tracing of anonymous digital cash.

BACKGROUND INFORMATION

Digital cash, also known informally as e-cash, is a form of digital currency. Cash is represented by electronic (digital) coins. As with ordinary coins, each digital coin has a fixed denomination. Coins are "issued" by a coin issuer, also referred to as a bank. Using cryptography, a bank signs a coin to certify the coin's authenticity.

In some electronic cash systems, such as the ECASH system commercially available from DIGICASH of Palo Alto, Calif., a user authenticates herself in a secure manner to a bank. The user then withdraws coins, which are numbers (or sets of numbers) that represent money, from the bank. The bank deducts funds corresponding to the withdrawn coins from her account. To spend a coin with a merchant, the user simply transmits the coin to the merchant. To prevent double spending of a coin, the merchant verifies on-line with the bank that the coin has not already been spent. An explanation of the DIGICASH protocols can be found in B. Schoenmakers, "Basic Security of the ecash™ Payment System," which appears in Computer Security and Industrial Cryptography: State of the Art and Evolution, ESAT Course 1997, edited by Bart Preenel et al.

One type of cryptography used in electronic cash systems is public/private key cryptography. One commercially available public/private key technology is RSA encryption technology, available from RSA Data Security, Inc. of San Mateo, Calif. To provide a simplified overview, an RSA signature is based on the difficulty of computing roots, for example cube roots, modulo a large modulus N with unknown factorization. A signer knows the factorization of the modulus N and so the signer is the only entity able to compute $f^{1/n}(x)$ mod N, for a given (x), where f is a one-way collision-free hash function, and $f^{1/n}(x)$ mod N represents the $n^{th}$ root of f(x) modulo (N). In the implementation of digital cash, a user who presents a merchant with the valid pair $(x, f^{1/n}(x)$ mod N), where n and N are publicly known numbers chosen by the bank, effectively demonstrates that the coin (x) has been authorized (or signed) by the bank, because only the bank can determine ($f^{1/n}(x)$ mod N) from x. To distinguish among different denominations in this scheme, the bank can use different public exponents. For example, $(x, f^{1/3}(x)$ mod N) might indicate a $0.50 coin, while $(x, f^{1/17}(x)$ mod N) might indicate a $1 coin.

Digital coins have been implemented that are both secure (in the bank's interest) and afford a heightened assurance of consumer privacy by providing anonymity to users with respect to both merchants and banks. Informally, a digital cash scheme is referred to as unconditionally blind or anonymous if the bank that issues a coin is unable to determine, either at the time of withdrawal or later upon examining circulating or deposited coins, which coin was withdrawn by which user. The user can withdraw money from the bank in such a scheme, spend it at a merchant, and be confident that when the merchant deposits the money at the bank, the bank will not be able to recognize the money as the same cash given to the user.

There are several variants of anonymous digital cash, not all of which have been implemented commercially. In a commercially available, on-line version implemented by DIGICASH, a coin consists of an RSA signature by the bank on the hash of a message (x). In this blinded protocol, the bank signs coin (x) by calculating ($f^{1/n}(x)$ mod N) without knowing what (x) is. At the time the coin is submitted to the bank for signature, the coin (x) is "hidden" from the bank by a blinding factor, which the user "multiplies in" and combines with (x) before transmission to the bank and "divides out" after the bank has signed.

Referring to FIG. 1, the bank publishes a public modulus N=pq, for which it alone knows the factorization (pq), and chooses a public exponent, which for this example is the exponent 3 (i.e. cube root). A user chooses random numbers (x) and (r), where (x) is the number to be used in the coin, and (r) is a blinding factor and $(X) \epsilon_r Z_N$ and $(r) \epsilon_r Z_N$, meaning that (x) and (R) are integers between (0) and (N−1) inclusive. The user calculates f(x) mod N, and multiplies the result by the blinding factor ($r^3$). The user sends ($r^3$f(x) mod N) to the bank. The bank determines the cube root mod N, which only the bank can do because the bank knows the factors (pq) of (N). The bank never knows (x), however, because it receives f(x) multiplied by the blinding factor ($r^3$). The bank then returns (r $f^{1/3}(x)$ mod N) to the user. The user extracts $f^{1/3}(x)$ from the quantity (r $f^{1/3}(x)$ mod N) it receives from the bank by dividing by (r). The user then can provide a merchant with the "signed" coin $(x, f^{1/3}(x))$. The merchant can verify that the bank has signed the coin $(x, f^{1/3}(x))$ by calculating f(x) mod N from x, and comparing it to the cube of ($f^{1/3}(x)$) modulo (N). This protocol is unconditionally blind, because the blindness does not rely on computational assumptions or statistical arguments.

A weaker notion of blindness can be described informally in terms of a lack of statistical correlation between the view of the signer at the time of signing and the set of produced signatures. A more formal definition of computational blindness may be described in terms of the following experiment. The user produces two messages $m_0$ and $m_1$ of length polynomial in $k_1$. The user sets a bit (b) uniformly at random. In two arbitrarily interleaved (and presumed blind) digital signature protocols, she presents the documents $m_0$ and $m_1$ to the bank in an order specified by (b), i.e., in the order $\{m_b, m_{1-b}\}$. In this interaction, she obtains from the bank signatures $s(m_0)$ and $s(m_1)$ on the two messages. The user presents the message/signature pairs $(m_0, s(m_0))$ and $(m_1, s(m_1))$ to the bank. The bank then attempts to guess the bit b. If no polynomial-time algorithm exists which enables the bank do so with probability 1/2+1/poly (over its own coin-flips and those of the user), then we say that the digital signature scheme is blind or secure with respect to anonymity.

Researchers have observed that unconditional anonymity in payment systems might be exploited to facilitate crimes like blackmail and money laundering. This observation spurred research into the idea of making anonymity in payment systems conditional, and, in particular, revocable by a third party. This notion is referred to as a trustee-based coin tracing. A National Security Agency report has since declared the availability of tracing in e-cash systems vital to the security interests of the United States. The importance of traceability in e-cash systems has motivated the proposal of various trustee-based coin tracing schemes.

One trustee-based tracing scheme is based on a blind Schnorr-like signature scheme and involves use of interactive proofs between trustees and the bank. Another trustee-based tracing scheme is based on blind RSA signatures, but make use of a cut-and-choose protocol, resulting in a scheme that is flexible but has rather large coin sizes and computational requirements.

Another scheme makes use of a blind signature based on that of Chaum and Pedersen. In this scheme, the user requests a pseudonym and registration information from a trustee. The user presents this registration information to the bank, and also incorporates it into the coins she withdraws.

Another scheme introduces the notion of "challenge semantics," enabling flexible determination of coin value, so that coins can be invalidated, for example in case of a bank robbery. This scheme is capable of addressing stronger attack models than many others and a wider range of commercial settings. It is also adaptable to use with any underlying digital signature scheme. On the other hand, this scheme requires on-line participation of a trustee in both coin withdrawal and coin spending.

Another scheme, referred to as "Magic Ink," makes use of blind DSS signatures. In this scheme, signing and anonymity revocation can be conducted by differing quorums of trustees. trustees are again, however, fully on-line, and the scheme is also rather computationally intensive for most operations.

A slightly different approach to trustee-based tracing is a system based on blind Schnorr signatures in which a user transfers funds from a non-anonymous to an anonymous account, and a trustee is capable of linking the two accounts. The chief disadvantage of this approach is that once the two accounts are linked, anonymity is eliminated.

Another approach is based on blind Schnorr signatures in which the trustee is wholly off-line. This system is quite complex, and involves well over a dozen modular exponentiations by the user at each coin withdrawal. Later developments reduced the computation required in the withdrawal protocol, as well as the database search requirements in owner tracing. The withdrawal protocol, however, still requires over a dozen modular exponentiations on the part of the user.

In addition to the above-described inefficiencies, the schemes described above involve changes or additions to the underlying structure of the coins. The therefore cannot be readily adapted to existing digital cash systems.

SUMMARY OF THE INVENTION

A simple and highly efficient trustee-based tracing mechanism is provided that can be added on top of anonymous cash schemes based on blind RSA signatures. The scheme can support both tracing of the identity of a user from a coin, referred to as coin tracing, and generation of a list of all coins belonging to a given user, referred to as owner tracing. Both of these operations require very little computation and database access.

The tracing mechanism according to the present invention has several important advantages over prior schemes. It can be incorporated straightforwardly on top of a commercially implemented on-line anonymous e-cash scheme, for example DIGICASH, with no change to the structure of the coins or the spending or deposit protocols, and can be easily applied to off-line e-cash variants as well. The tracing mechanism according to the present invention imposes minimal computational overhead on the underlying withdrawal scheme for the user—essentially just several modular multiplications and a Message Authentication Code ("MAC"). Most other schemes carry overhead for the user amounting to several modular exponentiations per transaction, which means as much as one hundred times more computation. Computational and storage requirements for the bank are also minimal. The tracing operation is also highly efficient. In the case of coin tracing, for instance, this scheme requires no database lookups, which most other schemes do. The tracing mechanism according to the present invention is also provably secure with respect to underlying cryptographic primitives.

The tracing mechanism requires user registration with a trustee upon set up of the user's account (and possibly again later, if the user spends a large number of coins). As a result of this interaction between user and trustee, the system requires storage of a small amount of authorization data for withdrawals. It should also be noted that to incorporate multiple trustees the system uses what amounts to a trusted dealer.

In general, in one aspect, the invention features a method for obtaining a trustee token from a trustee. The method includes transmitting to a trustee information describing a blinded digital coin and receiving from the trustee a trustee token comprising a signature by the trustee on the blinded coin.

Embodiments of this aspect of the invention include the following features. In one embodiment, the information describing the blinded digital coin is the blinded digital coin. In another embodiment, the information describing the blinded digital coin comprises a random seed for generating one or more blinded digital coins. In another embodiment, the information describing the blinded digital coin further comprises a quantity of desired coins for generating the quantity of desired blinded digital coins. In another embodiment, before the transmitting step, the method includes establishing identity with the trustee using a secret. In another embodiment, the secret comprises a public/private key pair.

In general, in another aspect, the invention features a system for obtaining a trustee token from a trustee. The system includes a transmitter transmitting to a trustee information describing a blinded digital coin, and a receiver receiving from the trustee a trustee token comprising a signature by the trustee on the blinded coin. In one embodiment, the trustee token comprises a signature by the trustee on one or a plurality of blinded coins.

In general, in another aspect, the invention features a method for generating a trustee token. The method includes receiving from a verified user information describing a blinded digital coin. Information describing the blinded digital coin and a verified user identifier are stored. A trustee token comprising a signature by a trustee on the blinded coin is generated using the information describing the blinded digital coin.

Embodiments of this aspect of the invention include the following features. In one embodiment, the the information describing the blinded digital coin is the blinded digital coin. In another embodiment, the information describing the blinded digital coin comprises a random seed for generating one or more blinded digital coins. In another embodiment, the information describing the blinded digital coin further comprises a number of desired coins for generating one or more blinded digital coins. In another embodiment, the trustee token includes the trustee's signature on one or a plurality of coins. In another embodiment, after the generating step, the trustee token is transmitted to the user. In another embodiment, before the receiving step, the identity of the user is verified using a secret. In another embodiment, the generating step includes generating a trustee token by using the information describing the blinded digital coin to generate the blinded digital coin, and signing the blinded digital coin. In another embodiment, the blinded digital coin is signed using a private key of a public/private key pair. In another embodiment, the blinded digital coin is signed using a Message Authentication Code ("MAC").

In general, in another aspect, the invention features a system for generating a trustee token. The system includes a receiver for receiving from a verified user information describing a blinded digital coin, a data store for storing the information describing the blinded digital coin and for storing a verified user identifier, and a token generator for generating a trustee token using the information describing the blinded digital coin. In one embodiment, the trustee token is a signature by a trustee on the blinded coin.

In general, in another aspect, the invention features a method for issuing digital cash. The method includes receiving a blinded coin and a trustee token from a verified user. In one embodiment, the trustee token is a signature by a trustee on a blinded coin. The method also includes verifying the trustee token, deducting an amount from an account associated with the user, and issuing the blinded coin with a value related to the amount deducted from the user's account.

Embodiments of this aspect of the invention include the following features. In one embodiment, before the receiving step, the identity of the user is verified using a secret. In another embodiment, the verifying step comprises calculating a Message Authentication Code ("MAC") on the blinded coin. In another embodiment, the verifying step includes verifying a trustee's public key. In another embodiment, the issuing step comprises signing the blinded coin.

In general, in another aspect, the invention features a system for issuing digital cash. The system includes a receiver for receiving a blinded coin and a trustee token from a verified user. The trustee token includes a signature by a trustee on a blinded coin. The system also includes a verifier for verifying the trustee token, a withdrawl mechanism for deducting an amount from an account associated with the user, and an issuer for issuing the blinded coin with a value related to the amount deducted from the user's account.

In general, in another aspect, the invention features a method for receiving digital cash from a coin issuer using a trustee token. The method includes transmitting a blinded digital coin and a trustee token to a coin issuer. The trustee token includes a signature by a trustee on the blinded coin. The method also includes receiving a signature on the blinded digital coin from the coin issuer.

In general, in another aspect, the invention features a system for receiving digital cash from a coin issuer using a trustee token. The system includes a transmitter transmitting a blinded digital coin and a trustee token to a coin issuer. The trustee token includes a signature by a trustee on the blinded coin. The system further includes a receiver receiving a signature on the blinded digital coin from the coin issuer.

In general, in another aspect, the invention features a method for obtaining revokably anonymous digital cash from a bank by using a trustee. The method includes establishing identity with the trustee using a secret, transmitting to the trustee information describing a blinded digital coin, receiving from the trustee a trustee token comprising a signature by the trustee on the blinded coin, transmitting the blinded coin and the trustee token to a bank, and receiving a signature from the bank certifying the blinded coin. Embodiments of this aspect of the invention further include unblinding the coin and transmitting the coin to a merchant.

In general, in another aspect, the invention features a method for tracing a digital coin. The method includes decrypting the coin to reveal a user identifier and matching the user identifier encrypted in the coin to an entity.

In general, in another aspect, the invention features a method for identifying a digital coin associated with a user. The method includes matching the user to a user identifier, matching the user identifier to coins transmitted to a trustee, and identifying the coins matched to the user identifier as coins associated with the user.

In general, in another aspect, the invention features a trustee token comprising a signature by a trustee on a blinded coin. In one embodiment, the trustee token comprises a signature by a trustee on one or more blinded coins. In another embodiment, the trustee token comprises a signature by a trustee on a plurality of blinded coins.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
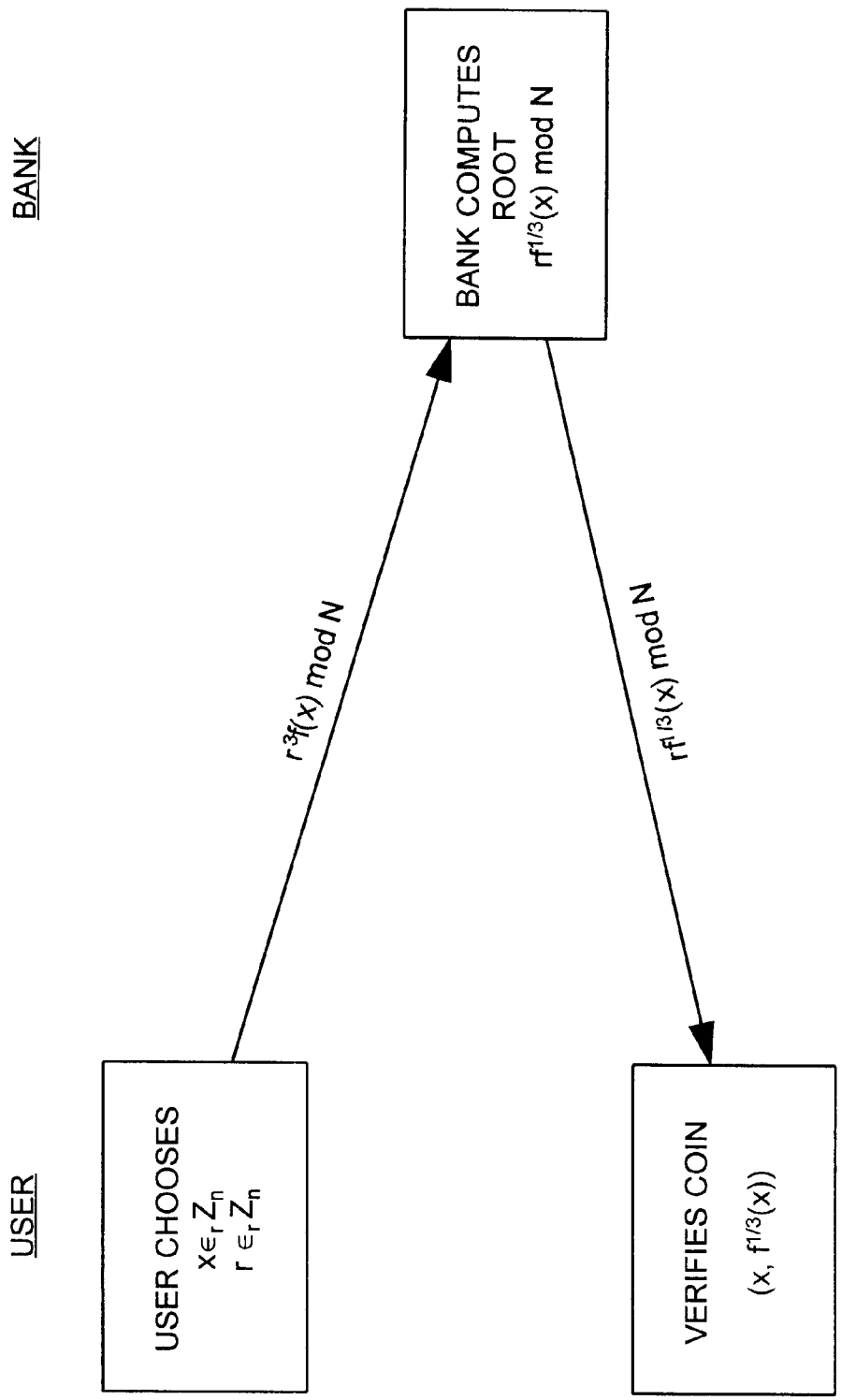
FIG. 1 is a prior art anonymous digital cash scheme.
Figure 2:
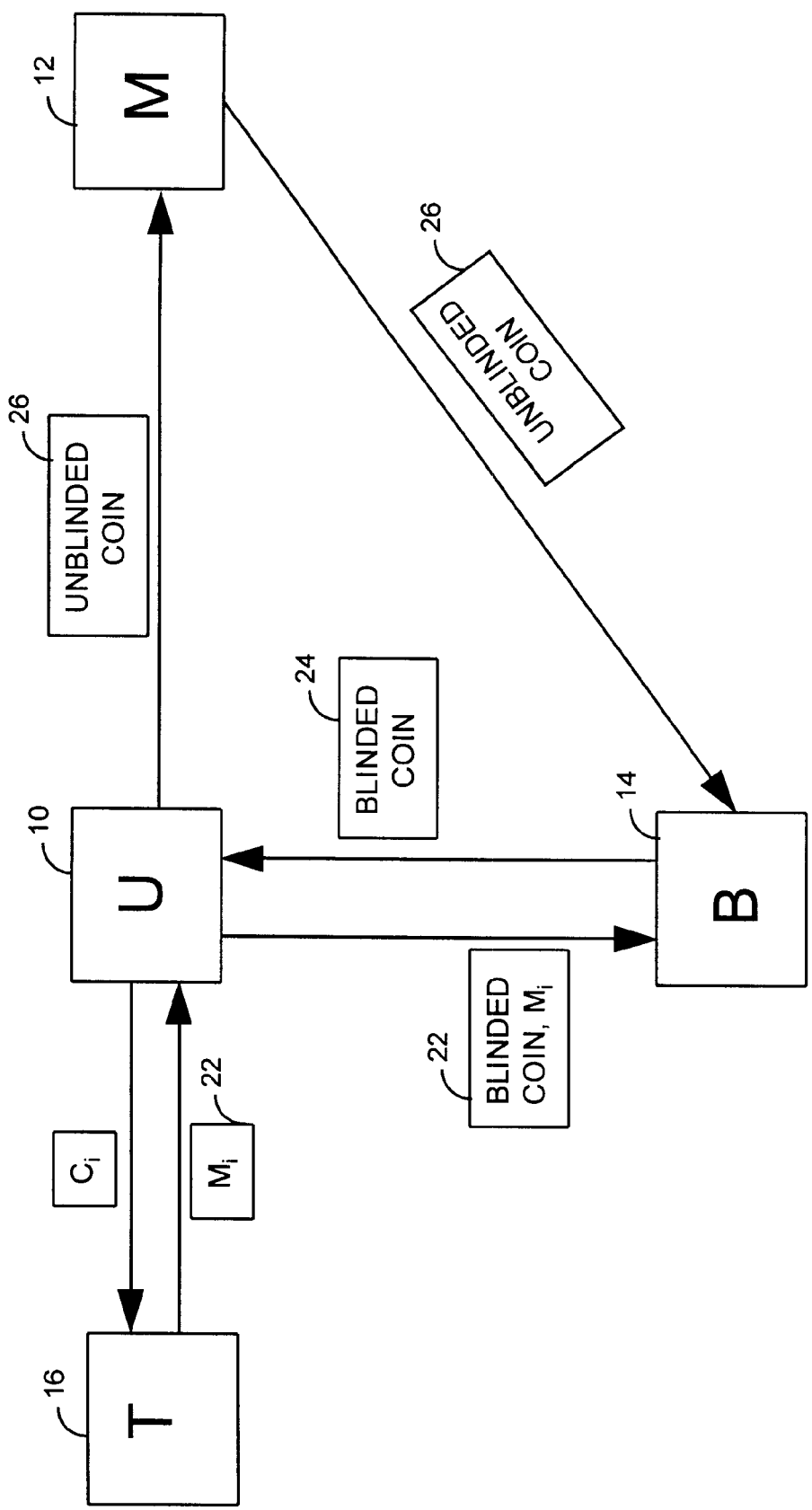
FIG. 2 is an embodiment of a traceable anonymous digital cash system according to the present invention.

Referring to FIG. 2, an anonymous digital cash scheme according to the present invention can include a bank (B) 14, a trustee (T) 16, a user (U) 10, and a merchant (M) 12. In one embodiment, the bank 14, trustee 16, user 10, and merchant 12 functionality described below are implemented with software running on commercially available general purpose computers, including for example a personal computer or a smartcard. In other embodiments, any of the bank 14, trustee 16, user 10, and merchant 12 functionality can be implemented as special-purpose hardware. Any of the bank 14, trustee 16, user 10, and merchant 12 can be in the same physical location or in different locations, providing there is a communications channel or channels between them, such as a data bus, network, or link that allows them to communicate as described below. Such a communications channel can always be active, as can be achieved by dedicated link to a data network, or may be periodically connected, such as with a dial-up data connection, or by connecting a smartcard to a reader, or by use of a store-and-forward communications link.

The bank 14 is a coin issuer, which can be a financial institution that issues anonymous digital coins and manages accounts. The user 10 withdraws digital cash from the bank 14 in the form of coins, which are numbers that are signed by the bank 14. The coins can be spent at a merchant 12. In one embodiment, the bank 14 publishes an RSA modulus (N), where (N=pq), whose factorization (pq) the bank 14 alone knows.

The trustee 16 is a trustworthy (i.e. secure and reliable) device or agency responsible for tracing coins. In one embodiment, the trustee 16 holds a secret key ($SK_T$) for some public key encryption algorithm and the trustee publishes the corresponding public key ($PK_T$). In one embodiment, the trustee 16 also holds a symmetric key (w), which it shares with the bank 14.

In one embodiment, the trustee is responsible for tracing coins upon presentation of a court order by a government or other authorized agency. In one embodiment, the trustee 16 acts as a neutral third-party in the transaction between the user 10 and the bank 14. The trustee 16 has information mapping a user's identity to digital coins. In one embodiment, to communicate with the trustee 16, the user 10 possesses a unique identifier or account number denoted by $ID_U$, and also a secret $s_U$ associated with $ID_U$ and used to prove the user's identity. The secret $s_U$ can be a public/private key, symmetric key, or other type of authentication, such as a password or biometric characteristic. The trustee 16 can match the user identifier $ID_U$ to the user's real-world identity.

In one embodiment, the bank 14 also recognizes the user identifier $ID_U$. In another embodiment, the user 10 is identified to the bank 14 by an alternate identifier $ID_U'$ that is different from the identifier $ID_U$ that identifies the user 10 to the trustee. Alternatively, the bank can transact with the user on an entirely anonymous basis using only account information.

The merchant 12 is any party with whom the user spends money. Anonymous digital cash tracing according to the present invention does not require modification of the underlying digital cash protocols involving the merchant, i.e., the spending and deposit protocols, and so these protocols are not discussed in detail. In one embodiment, the coin is chosen so that the value used for the coin can be identified with a particular user by the trustee and so there is no need for any change to the coin or to the spending and deposit protocols.

In the following discussion, (f) denotes a secure one-way or hash function, and $MAC_w(m)$ denotes a Message Authentication Code ("MAC") computed using symmetric key (w). Message Authentication Codes, also referred to as key-dependent one-way hash functions, are described in the Handbook of Applied Cryptography by A. J. Menezes, P C. van Oorschot, and S. A. Vanstone, CRC Press 1996. $E_{PKx}(m)$ denotes the encryption (under some appropriate asymmetric cipher) of the message (m) using the public key $PK_x$. The notation (PS) denotes an indexed pseudo-random generator, although other generators, for example a chained generator, can be used as well. The notation $PS_A(i)$ denotes the output of the generator with secret seed (A) on index (i). The set $\{X_i\}$ denotes the set of values $X_i$ over all appropriate values of i. The symbol || denotes concatenation of strings, ⊕ denotes the XOR operation, and $\epsilon_R$ denotes uniform random selection from a set.

Three security parameters are denoted by $k_1$, $k_2$, and $k_3$. The parameter $k_1$ is the length of the seed to the pseudo-random number generator (PS), and thus specifies the level of security on the user's anonymity. The parameter $k_2$ specifies the length of the digital signature modulus (N) used by the bank for signing coins, and thus the hardness of existential forgery. The parameter ($k_3$) specifies the length of the trustee tokens or MACs. This is essentially equivalent to the level of security on the trustee's ability to trace the user's coins. The notation 1/2+1/poly denotes a probability greater than or equal to $1/2+1/k^c$, where (c) is some constant and (k) is the pertinent security parameter.

Referring again to FIG. 2, in one embodiment, before interacting with the bank, the user 10 sends one or more blinded coins $C_i$ 22, or information sufficient to generate one or more blinded coins $C_i$ 22, to the trustee 16. In response, the user 10 obtains from the trustee 16 one or more corresponding trustee tokens $M_i$ 24. The trustee tokens $M_i$ 24 are essentially proof that the blinded information the user is presents to the bank has been seen and its correctness verified by the trustee. In one embodiment, the trustee tokens $M_i$ 24 are 10–50 bits, which are short enough to be useful and long enough to assure security, although it should be clear that the number of the bits in the trustee token $M_i$ is not a limitation on the invention. A trustee token $M_i$ is presented to the bank when the user withdraws money. A trustee token $M_i$ reveals no information to the bank about the coin the user obtains. For the sake of simplicity, in the following discussion, one trustee token $M_i$ is described for each coin withdrawal. As described later, a single trustee token $M_i$ can be used for multiple coins.

Figure 4:
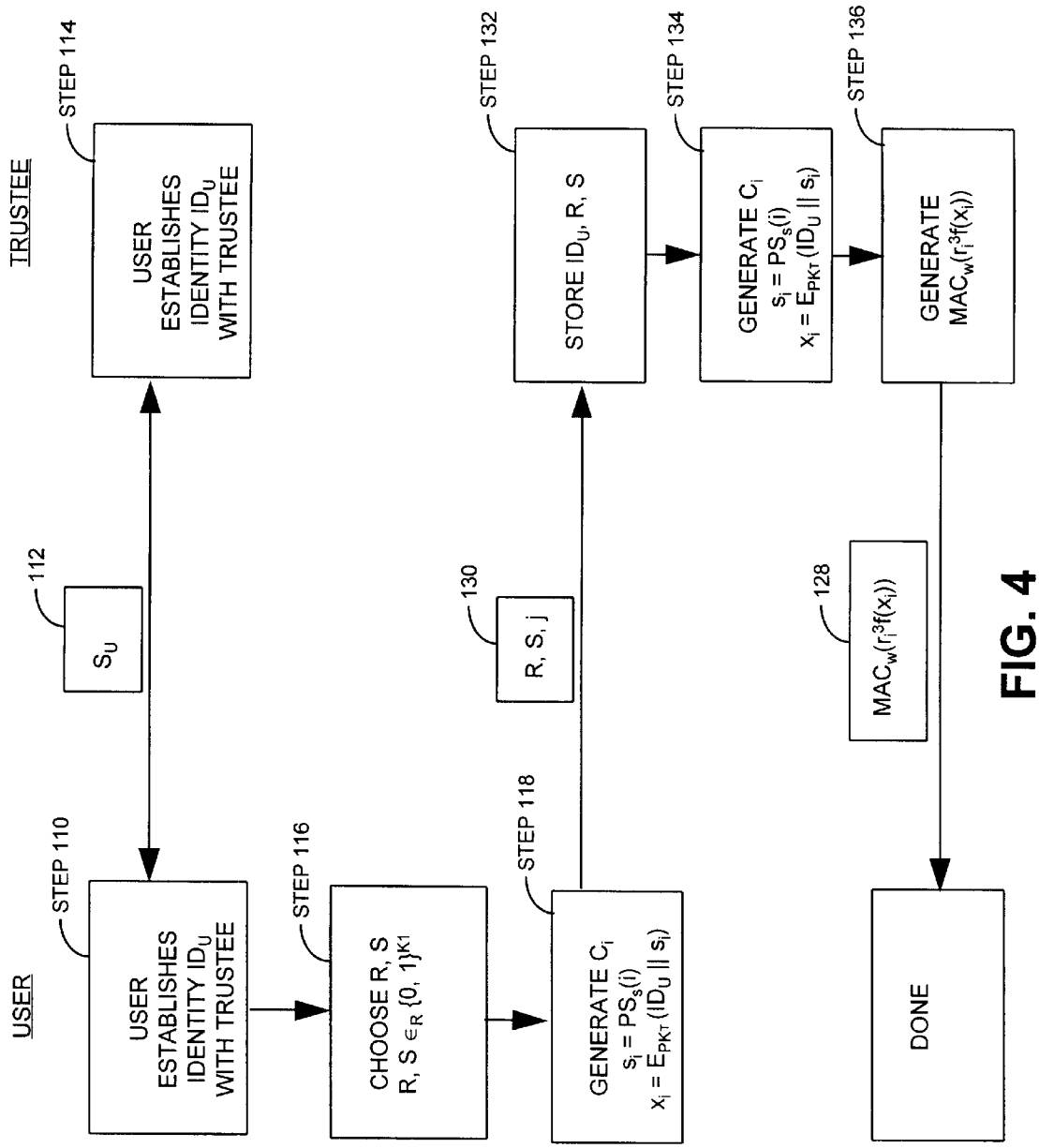
FIG. 4 is a block diagram depicting another embodiment of trustee token withdrawal protocol according to the present invention.

To obtain trustee tokens, the user 10 contacts a trustee 16. The user 10 establishes the user's identity $ID_U$ with the trustee 16, for example using secret $s_U$. Once the user's identity has been established with the trustee 16, the user 10 sends blinded coins to the trustee 16. Alternatively, as in the embodiment of FIG. 4 described below, the user 10 can send information describing the coins, and the trustee 16 generates the blinded coins. The trustee 16 can match the coins to the user's identifier $ID_U$, even after the coins have been unblinded. The blinded coins are signed by the trustee 16. The trustee's signature of the coins $C_i$ comprises the trustee token $M_i$. In one embodiment, the signature is a digital signature using public/private (asymmetric) key encryption. In another embodiment, the signature is a MAC that is determined using symmetric encryption. The signature can made using encryption with a asymmetric or a symmetric key.

By requesting many trustee tokens in advance of coin withdrawals, and batching trustee tokens so that they apply to multiple coins (as described later), the user can achieve a very low frequency of interaction with the trustee 16. For example, user-trustee interaction can be limited to account set-up, or to account set-up and infrequent, off-line communications.

In some anonymous digital cash withdrawal protocols such as the DIGICASH protocol described above, to obtain a coin ($x_i$, $f^{1/n}(x_i)$ mod N) the user sends to the bank the blinded quantity $r_i^n f(x_i)$ mod N. If the quantity ($x_i$) contains information sufficient to identify the user 10 to the trustee 16, then it is possible to have coin be revocably anonymous without a change to the structure of the coin.

In one embodiment, the user's identifier $ID_U$ is concatenated with a pseudorandom value and encrypted under the public key of the trustee, so that ($x_i = E_{PKT}(ID_U || s_i)$, where $s_i = PS_S(i)$). The quantity ($x_i$) thus can be computed from seed (S) and identifier ($ID_U$). The blinding integer ($r_i$) is generated from a random seed (R), so that $r_i = PS_R(i)$. These coins can be generated by the user and sent to the trustee for verification and signature.

Alternatively, if the trustee has an identical pseudorandom generator, just the seed need be sent to the trustee, and the trustee can generate the coins. In one embodiment, the user transmits random seeds (R) and (S) to the trustee, and the trustee generates the desired trustee tokens. The seeds (R) and (S) constitute all of the data required by the trustee to perform owner tracing against the user. Note that (R) and (S) are given as separate seeds for notational convenience. In practice, they may be combined into a single seed. The transmission of only the random seed provides communication and storage efficiency.

In the following discussion of the trustee token and coin withdrawal protocols, the computations are performed (mod N). To simplify notation, explicit indication of the (mod N) calculation may be omitted.

Figure 3:
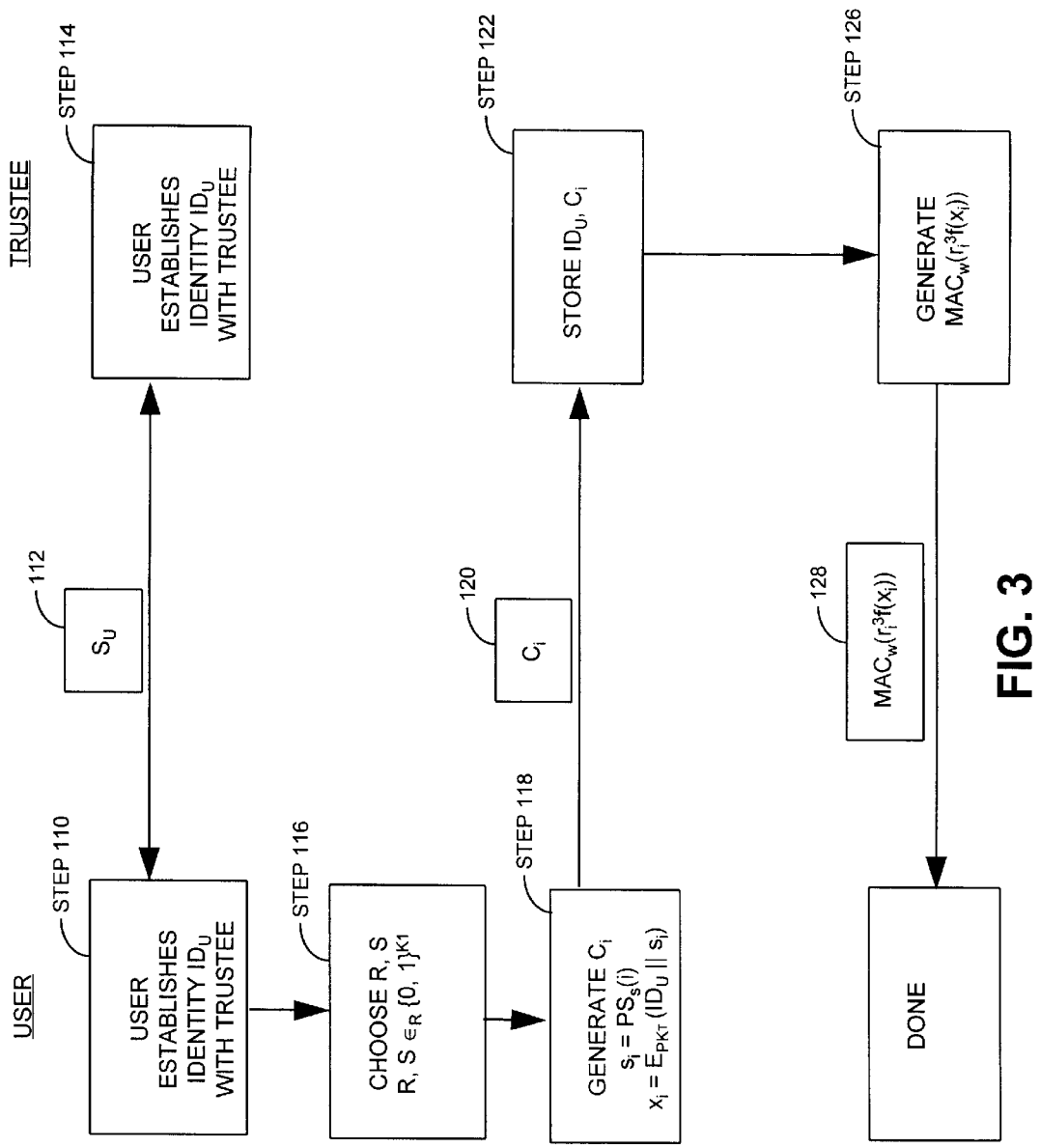
FIG. 3 is a block diagram depicting an embodiment of the trustee token withdrawal protocol according to the present invention.

Referring to FIG. 3, in STEP 110 and STEP 114, the user proves her identity to the trustee. This can be accomplished using a secret $S_U$ 112, which may be a public/private key, symmetric key, or other type of authentication, such as a password or biometric characteristic. In STEP 116, the user chooses a seed that is used to generate one or more coins ($C_i$) 120. In the embodiment of FIG. 3, the seed is has elements (R),(S). In STEP 118, for each coin ($C_i$) 120 the user determines $s_i = PS_S(i)$, and then determines $x_i = E_{PKT}(ID_U \| s_i)$. If there are j coins ($C_i$), the user will determine $x_i$ for each i from 1 to j. Having determined $x_i$, the user determines $r_i^3 f(x_i)$, which is the blinded coin. The user transmits the coin ($C_i$) to the trustee. The trustee stores the user's identifier $ID_U$ along with the coin ($C_i$). The trustee can verify that it can extract the user identifier $ID_U$ from the coin, that is the trustee can verify that the coin is well formed. In STEP 126, the trustee calculates a MAC on the blinded coin ($r_i^3 f(x_i)$) using (w), the symmetric key that the trustee shares with the bank, STEP 126. The trustee's signature of the coin(s) ($C_i$) comprises the trustee token. The trustee sends the trustee token back to the user in step 128. To prevent compromise of the coin and the trustee tokens, communication between the user and the trustee can take place over an authenticated and encrypted channel.

In other embodiments, it is possible for the user to send, instead of the coin 120, information which makes it possible for the trustee to generate the coin 120. In one such embodiment, and referring to FIG. 4, STEP 110, 114, 116, and 118 are the same, but instead of the user transmitting the coin to the trustee, the user transmits the seed (R),(S) and the desired number of coins j 130. In STEP 132, the trustee stores the user identifier $ID_U$ and the seed (R),(S). In STEP 134, the trustee generates one or more coins $C_i$ from the user identifier $ID_U$, and the seed. The trustee then generates a trustee token for the coin(s) $C_i$ by calculating a MAC on the blinded coin ($r_1^3 f(x_i)$) using (w), the symmetric key that the trustee shares with the bank, STEP 136. The trustee's signature of the coin(s) ($C_i$) comprises the trustee token. The trustee sends the trustee token back to the user in step 128.

The user can request and store a large number of trustee tokens, since tokens are small. These tokens may be used for future withdrawals without the need for additional contact with the trustee until the user exhausts her supply. The tokens can be stored with the coins, or to save space a MAC for a quantity of coins can be stored with the seed/quantity information so that the coins can be regenerated later.

Although the token withdrawal protocol is described as an interaction with an on-line trustee, it will be understood that this is not a limitation. For example, trustee tokens can be requested using a secure store-and-forward system, or, alternatively, loaded on a smart card by the trustee.

Figure 5:
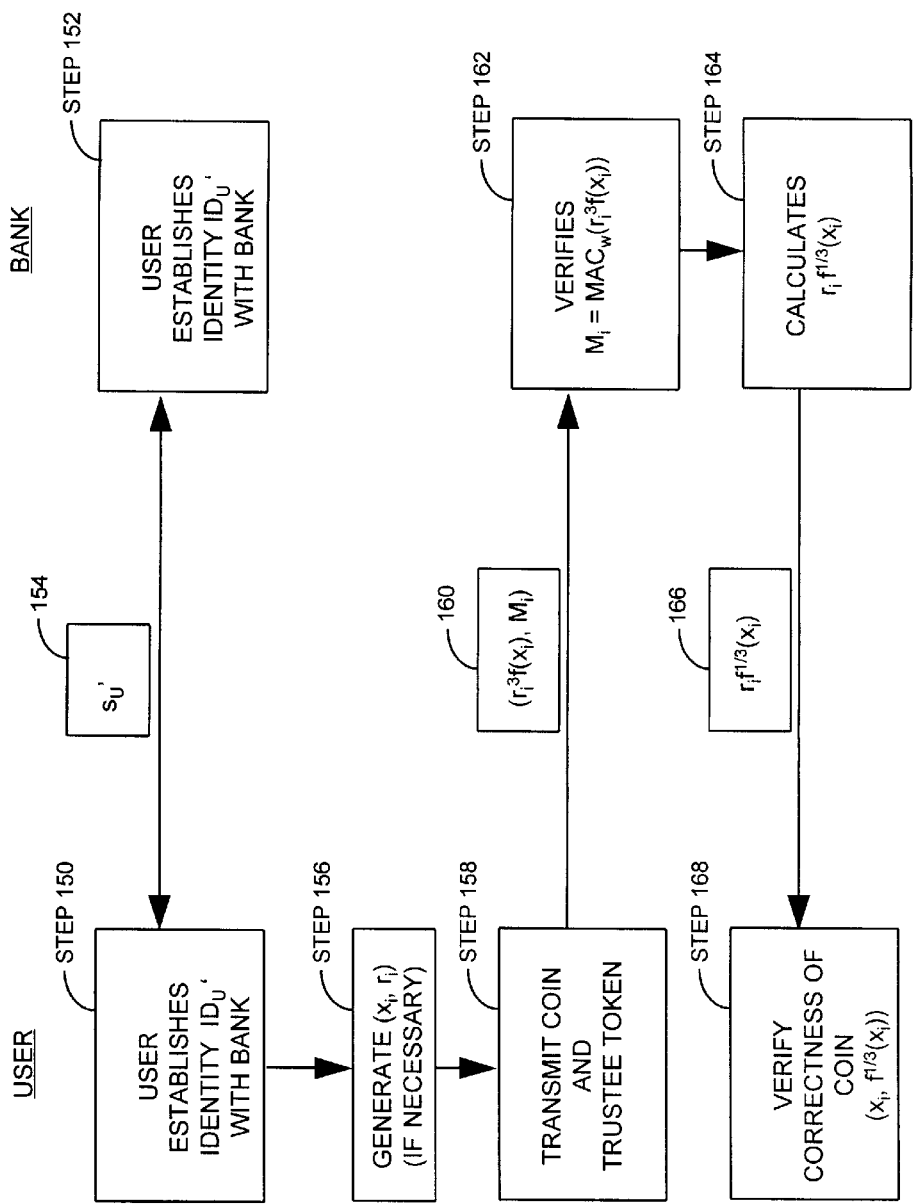
FIG. 5 is a block diagram depicting an embodiment of the coin issuer withdrawal protocol according to the present invention.

Referring to FIG. 5, one embodiment of the coin withdrawal protocol is essentially the same as in the underlying electronic cash protocol, with the exception that the bank verifies, by means of a valid trustee token, that the user's withdrawal request has been authorized by the trustee. The user establishes identity with the bank STEP 150, STEP 152. This can be accomplished using a secret $S_U$' 154, which may be a public/private key, symmetric key, or other type of authentication, such as a password or biometric characteristic. The secret $S_U$' that the user shares with the bank may be the same or different from the secret $S_U$ that the user shares with the trustee. Having authenticated itself to the bank, the user can transmit to the bank one or more blinded coins. If the user has not stored the blinded coins, then the user generates ($r_i^n f(x_i)$) from ($x_i, r_i$), where ($x_i, r_i$) is generated from (R),(S) by determining $S_i = PS_S(i)$, $X_i = E_{PKT}(ID_U \| s_i)$, and $r_i = PS_R(i)$. If the user has stored the coin(s), it is not necessary to regenerate the coin(s), and in STEP 158 the user transmits to the bank the coin(s) along with the trustee token ($r_i^n f(x_i), M_i$) 160 received from the trustee. The bank verifies $M_i = MAC_w(r_i^n f(x_i))$ using the symmetric key w that it shares with the bank (STEP 162). If the MAC is correctly formed, meaning that the trustee has certified that it is storing the appropriate tracing information, then in STEP 164 the bank determines the root ($r_i f^{1/n}(x_i)$) and transmits the result 166 back to the user. The user can then unblind the coin and verify the correctness of the coin, by calculating $f(x_i)$, and by multiplying $f^{1/n}(x_1)$ by itself n times, and comparing the two results (STEP 168). To prevent theft of the user's coins, the coin withdrawal protocol can take place over an authenticated and encrypted channel (on which even the trustee cannot eavesdrop).

In one embodiment, the trustee tokens are used with off-line variants of Chaumian e-cash (such as the Untraceable Electronic Cash described by Chaum, Fiat, and Naor in Advances in Cryptology—CRYPTO '88). Off-line ecash variants involve the user's embedding tracing information in coins that gets revealed when a coin is double-spent. To employ trustee tokens, then, in an off-line scheme, it suffices for the user to generate this tracing information from the seed (S). The tracing scheme of the present invention can make off-line systems more efficient by allowing the trustee to verify coin information incorporated to prevent double-spending.

To trace a coin $C_i$, the trustee is given the coin ($x_i$). Since $x_i = E_{PKT}(ID_U \| s_i)$, the trustee may extract $ID_U$ from a coin $C_i$ simply by performing a decryption with its secret key $SK_T$. The user identifier $ID_U$ will then be revealed.

To perform owner tracing, the trustee is given a user identifier $ID_U$. In one embodiment, the trustee can look up all the coins ($C_i$) associated with the user identifier. In another embodiment, the trustee has stored (R),(S), with the associated user identifier. The trustee uses (S) to compute all $\{x_i\}$. This is sufficient to identify all coins withdrawn by the user $ID_U$.

If the trustee is presented with a single coin, the trustee can extract the user identifier $ID_U$ from the coin, and then determine all other coins associated with that user identifier $ID_U$. In contrast to some other schemes, it is possible for the trustee to identify not only all coins withdrawn by the user and subsequently deposited, but also all coins in current circulation, and even some coins to be withdrawn by the user in future transactions.

As explained above, the trustee-based tracing scheme adds very little computational overhead to the underlying coin withdrawal protocol. The bank computes a MAC that it would not otherwise compute, but this requires negligible effort in comparison with generation of the signature on the coin. The user must compute the values ($r_i$) and ($x_i$) from a pseudo-random generator, but these values would likely be computed in some pseudo-random fashion in any case. In fact, if the bank uses a signature exponent of 3, the user need only compute two pseudo-random values, a hash, six modular multiplication operations, and a modular inversion per withdrawal (including verification that it has a valid coin). This is an improvement over some schemes that, for example, require fifteen (160 bit) modular exponentiation operations on the part of the user at the time of withdrawal, and even more if the scheme is to permit owner tracing.

The token withdrawal process requires no computationally intensive cryptographic operations—just a few hashes and computations of MACs. The storage requirements for trustee tokens are also minimal. The trustee stores a pseudo-random seed for each user (perhaps 80 bits). In the scheme described above, the user stores a minimal amount, for example 10–100 bits, for each trustee token. A coin in some other schemes consists of roughly 1000 bits. Hence, the storage of a collection of trustee tokens will not be difficult on a device capable of storing anonymous digital cash. In fact, at 10 bits per token, 1 K bytes of memory is enough to store more than 800 trustee tokens.

For the sake of simplicity, we have assumed in the above description of our scheme that one trustee token is used for every withdrawal. It is possible to improve the storage efficiency of trustee tokens substantially by making a single trustee token good for multiple withdrawals., at the cost of some linkage of user identity across coin. Suppose, for instance, that the user always withdraws coins in multiples of ten. Then we could let $M_j=MAC_w(r^3_{10j}f(x_{10j}), r^3_{10j+1}f(x_{10j+1}), \ldots, r^3_{10j+9}f(x_{10j+9}))$. In other words, the MAC is calculated on ten coins. A first token $M_0$ is good for the first ten withdrawals, $M_1$ for the next ten withdrawals, etc. In fact, it is not even necessary for the user to withdraw coins in groups of ten. With a very slightly more complicated protocol, the user can send all ten coins for calculation of the MAC, but only request a withdrawal of a subset of the coins. In other words, the user need only send a number of blank withdrawal requests, i.e., a sequence of $r_i^3 f(x_i)$ for which she does not wish to receive the corresponding coins. Note that if one token is to be used for multiple withdrawals, then it is probably desirable for the token to be larger than it would be for one withdrawal. A token of length, say, 50 bits, should be adequate for most any application. If enough batching is performed, it may be efficient to use digital signatures instead of MACs, eliminating the need for secret key establishment between the trustee and bank. Of course, making a single trustee token good for multiple withdrawals comes at the cost of some linkage of user identity across coins.

One embodiment of a system according to the present invention is optimized for use with cash carrying devices containing relatively small amounts of memory and for trustees with limited database resources. Of course, trustee tokens may be used to achieve a wide range of tradeoffs involving protocol efficiency, storage requirements, security levels, and token sizes. It may also be helpful to store trustee tokens in different data structures, such as hash trees.

The system has been described as having only a single trustee. It is possible to achieve k-out-of-n tracing with any number (n) of trustees by sharing the secret $SK_T$ among the (n) trustees in an initialization phase. It is also necessary, however, to share (R), (S), and $ID_U$ for each user after the corresponding trustee tokens have been distributed. Sharing may be performed using any of a number of threshold and/or proactive secret-sharing techniques.

While flexible, this method of incorporating multiple trustees into our scheme achieves weaker security guarantees than some other systems. The secrets (R) and (S) are revealed by the user, and are shared among trustees. These secrets, which enable owner tracing (but not coin tracing), are thus vulnerable to attack during the token withdrawal protocol. Hence the entity handling the user secrets acts essentially like a trusted dealer. This may be acceptable if sufficient controls on handling of user secrets are set in place.

Another possibility is to make the bank effectively act as a trustee. The user's identifier $ID_U$ could be identical with respect to the bank and the trustee. It is possible, however, for the user to identify herself as $ID_U$ with respect to the bank and separately as $ID_U'$ with respect to the trustee, where $ID_U'$ is a pseudonym authorized and recorded by the bank and mathematically unrelated to $ID_U$. In this manner, both the trustee and the bank must participate in tracing. Of course, the user would need to shield her real-world identity from the trustee during the token withdrawal protocol. This can be achieved by having the bank serve as a proxy server for the user, by using an anonymous store-and-forward approach to token distribution, or by having tokens preloaded on smart cards that are then distributed by the bank.

The following discussion describes four aspects of the security of our scheme, user anonymity, non-forgeability of coins, traceability, and the inability of the trustee to steal the user's cash. We are able to prove that our system is secure in all four of the above senses, relative to underlying cryptographic primitives. To provide a flavor of the proof techniques employed here, we give a rigorous proof of the security of user anonymity. In other cases, we provide proof sketches.

With regard to user anonymity, the bank should not be able to extract any information from its interactions with users that reveals which coins have been withdrawn by whom. As we shall show, the security of user anonymity in our system is dependent on $k_1$, the security parameter, i.e., seed length in bits, of the pseudo-random number generator. (In one embodiment, an acceptable level of security is achieved by letting $k_1$ be about 80.)

In the underlying blind RSA signature scheme, anonymity is unconditional, i.e., information theoretically secure. In particular, use of the blinding factor (r) ensures that the bank receives no information about withdrawals. In our system, however, we introduce a pseudo-random number generator (PS) to enhance efficiency. We prove the security of anonymity relative to that of (PS). As mentioned above, the two random seeds, (R) and (S), can in practice be reduced to one seed (S). In our proofs, we shall assume that this is the case.

First some definitions. Let $PS_S$ denote the output (of an appropriate length) of (PS) given seed (S). Let (A) be a polynomial time algorithm that outputs a 0 or a 1. Let $EX_Z[A(M)]$ denote the expected output of algorithm A given input M over uniform random choices of Z, i.e., the probability that A(M)=1. The pseudo-random generator (PS) may be said to be broken if a polynomial time algorithm (A) may be found such that $|EX_S[A(PS_S)]-EX_R[A(R)]|=1/poly$.

The idea behind the proof is simple: user anonymity is information theoretically secure in the case where the user employs purely random inputs. If user anonymity can be broken in the case where the user employs a pseudo-random number generator, then it is possible to distinguish between random and pseudo-random inputs. This is equivalent to breaking the pseudo-random number generator. In other words, if the bank is able to break the anonymity in this scheme, then it can break the pseudo-random generator (PS).

This is true because the values $\{M_i=MAC_w(r_i^3 f(x_i))\}$ are generated using the values (w) and $r_i^3 f(x_i)$ as inputs. These {$M_i$} thus can only provide the bank with information about values it already sees in the clear. These {$M_i$} provide no information that might enable the bank to break user anonymity.

Let (D) be an algorithm constructed as follows. Algorithm (D) takes as input three bitstrings, (X), (Y), and (Z), as well as a polynomial time algorithm (B). Algorithm (D) simulates a user 1 using bitstring (X) as a source of randomness and simulates a user 2 using bitstring (Y) as a source of randomness. The bitstring (Z) serves as a source of randomness for algorithm (B). Algorithm (B) simulates the bank in the anonymous withdrawal scheme and then attempts to break the anonymity of the scheme. It does this relative to withdrawals conducted by simulated users user 1 and user 2 in accordance with the experiment described in the definition of blindness above. If the algorithm (B) guesses successfully in this experiment, then (D) outputs a 1 and we write $D_B(X,Y,Z)=1$. Otherwise $D_B(X,Y,Z)=0$, i.e., (D) outputs a 0. The algorithm (D) may be viewed as a distinguishing algorithm: it tries to use (B) to distinguish between the distributions from which (X) and (Y) are drawn.

It is clear from the definition of blindness in above that the anonymity of our scheme is insecure if there exists an algorithm (B) such that $EX_{S,S',Z}[D_B(PS_S, PS'_S, Z)]=1/2+1/\text{poly}$. In order words, the anonymity of our scheme is insecure if it is possible to distinguish between the withdrawals of a user 1 with secret seed (S) and a user 2 with secret seed S'. Recall that the underlying anonymous withdrawal scheme is information theoretically secure. Thus for all algorithms (B), it is trivially the case that $EX_{R,R',Z}[D_B(R,R',Z)]=1/2$, i.e. there is no way to distinguish between two truly random sources. It is easy to see therefore that if there is some polynomial time algorithm (B) such that $EX_{S,R,Z}[D_B(R, PS_S, Z)]=1/2+1/\text{poly}$, then (PS) is insecure. We will now show how a compromise of anonymity leads to this situation.

Suppose our scheme is insecure and thus there exists an algorithm (B) such that $EX_{S,S',Z}[D_B(PS_S, PS_{S'}, Z)]=1/2+1/\text{poly}$. We can then construct a polynomial time algorithm D'(X) which takes as input a bitstring (X), generates a random seed S', and then outputs $D_B(X, PS_{S'}, Z)$. If (PS) is secure, then $EX_{R,S',Z}[D_B(R, PS_{S'}, Z)]<1/2+1/\text{poly}$, so that $EX_R[D'(R)]<1/2+1/\text{poly}$. But if $EX_R[D'(R)]<1/2+1/\text{poly}$, then $EX_R[D'(R)]-EX_S[D'(PS_S)]=1/\text{poly}$, and thus (PS) is insecure. From this contradiction, it follows that if user anonymity in our scheme is insecure, then (PS) is insecure.

We now proceed to treat the issue of forgeability of coins. The users of the system and the trustee, even in collaboration, should not be able to mint coins without express participation of the bank. The hardness of forgery in our system is determined by security parameter $k_2$, equal to the length of the modulus (N). (In one embodiment, the security parameter $k_2$ may safely be set at 1024.) The secret key (w) shared by the trustee and bank is independent of the secret minting key of the bank. Thus, even if the trustee and user collaborate, they can obtain no more information about the bank's minting key than the user herself could. We thus can show that it is as hard in this scheme for the user and trustee to forge coins collaboratively as it is for the user to do so herself in the underlying blind digital signature scheme. Formal proof of this theorem depends upon the fact that the user can simulate the establishment of a secret key between trustee and bank. In carrying out the withdrawal protocol in the underlying scheme, the user can then simulate both the role of the trustee and the role of the bank in processing trustee tokens. Thus, in our scheme, the trustee can provide no additional information useful to the user in committing forgery.

The theory regards the assurance of the trustee that the user cannot cheat and evade tracing of her coins. The trustee should be able to perform both coin tracing and owner tracing with high probability. The security of tracing in our system is determined by security parameter $k_3$, equal to the length of the trustee tokens in bits, and by security parameter $k_2$. (For most purposes, it would be acceptable to let $k_3$ be 10–50 bits.) We can show that the user must either forge a MAC or forge a coin to cheat successfully in this way. In other words, suppose that the user is able to produce a coin which cannot be traced by the trustee. Then the user was successful at either forging a coin or forging a MAC. This can be shown as follows: If the user is able to produce an untraceable coin (C), then either the user forged (C), or the user withdrew (C) from the bank. If the user withdrew (C), and (C) is untraceable, then the user must have provided the bank with an invalid MAC.

More specifically, it is presumed that the user cannot forge a coin in polynomial time with more than a negligible probability. Therefore the probability that a given coin (C) held by a cheating user is untraceable is roughly equal to the user's ability to forge a MAC. Under reasonable assumptions this is about $2^{k_3}$, where $k_3$ is the length of the trustee tokens in our scheme. Thus, a 10-bit trustee token should yield a probability of less than $1/1000$ of the user being able to evade tracing for a given coin. For most law-enforcement purposes, this should be adequate, particularly as law enforcement officers are likely to have multiple coins available for tracing in most scenarios. Moreover, the user can only verify the correctness of a MAC by interacting with the bank. Her efforts at cheating are thus likely to be detected by the bank before she obtains an untraceable coin. For very high security applications, it may be desirable, however, to use MACs of up to, say, 50 bits. (Note that while MACs of 32 or even 64 bits are typical in most financial transactions, the risks in such cases are much greater, involving the potential for many millions of dollars to be misdirected.)

Finally, we consider the ability of the trustee to steal the user's money. Although the trustee should be able to link the user to her coins, he should not be able to steal her coins or make withdrawals from her account. It is common practice not to consider efforts by the bank to steal the user's money: it is assumed that the bank, which has control of the user's account in any case, must be trusted in this respect.

Although the trustee has access to the secrets of the user employed to generate coin data, the trustee does not have access to the user secret $s_u$. Therefore, the trustee cannot impersonate the user and withdraw money from the user's account without the bank's collusion. This yields the following theorem: it is infeasible for the trustee to steal money from the user's account without the collusion of the bank or the user. This can be shown as follows: The bank only withdraws money from the user's account if authorized to do so through a channel authenticated by means of the user's secret $S_U$. This channel is authenticated so that no eavesdropper, even the trustee, can steal the user's coins.

In our exposition above, we assume the trustworthiness of trustee, and that the MAC held jointly by the trustee and bank is well protected. In some scenarios, it may be desirable to make weaker security assumptions. We can achieve this—at the cost of computational and storage efficiency-with more extensive record keeping and use of digital signatures by the trustee.

If an attacker manages to seize the MAC shared by the bank and the trustee, and the theft goes undetected, he can present false trustee authorization to the bank. This would enable him to withdraw untraceable coins. There are many possible defenses against this attack, representing a spectrum of tradeoffs between efficiency and security. One possible countermeasure would be to refresh the shared MAC on a frequent basis. If this MAC is generated collaboratively between the bank and trustee, then forward secrecy may be obtained with respect to either one of the two parties. Thus, if an attacker were to seize the current MAC undetected, he would have only a narrow window of time in which to exploit it. Another option would be to have the trustee digitally sign tokens using a public key signature algorithm, rather than MACing them. The signing key of the trustee could then be distributed among multiple entities using distributed sharing and signature techniques. While this variant on our scheme provides stronger security guarantees, is rather less efficient in terms of the computation required to produce a token.

In the above variants, if a coin (C) is presented to the trustee and the coin cannot be traced, it is unclear whether the trustee or the bank permitted withdrawal of an untraceable coin. This can be remedied by having the trustee digitally sign all tokens, and requiring the bank to keep track of all coin withdrawal transcripts for each user and the trustee to keep track of the number of token withdrawals. If untraceable coins surface, then the bank and trustee records can be compared, and a determination made as to whether the cheating party is the bank or the trustee.

As described above, the trustee can frame the user. In particular, the trustee can generate a value (X) based on a pair of values ($r_i$, $s_i$) not yet employed by the user (or based on false seed pair (R', S'), withdraw from the bank a coin $C_i$ based on $x_i$, spend the coin on some illicit purchase, and then claim that the user was responsible, adducing the registered seed pair (R,S) as evidence.

It is possible to prevent attacks of this nature as follows. We have the user digitally sign (R,S). We then have the bank record all blinded values presented for signing, as well as the number of withdrawals by the user. The bank rejects any withdrawal request based on a previously presented blinded value. Now if trustee attempts, under a false identity, to withdraw a coin $C_i$ (based on a user's seed pair (R,S) when $C_i$ has already been withdrawn, he will be stopped. If he withdraws a coin $C_i$ not already withdrawn by the user, then the user is able to prove, on revealing (R,S) and adducing the bank's counter as evidence, that she was not responsible for the initial withdrawal of $C_i$. Hence, framing of the user would require collusion between both the bank and the trustee framing of the user by the bank is infeasible because the bank has no knowledge of (S).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for obtaining certification from a trustee, the trustee being an authority independent of an electronic currency issuing entity, the trustee certifying the revocable anonymity of the identity of an entity and its association with at least one unit of electronic currency, the method comprising the steps of:

transmitting to a trustee information representing at least one unit of electronic currency;

transmitting to the trustee information uniquely identifying an entity associated with the at least one unit of electronic currency; and receiving from the trustee a trustee token comprising a trustee electronic signature, the trustee electronic signature certifying the revocable anonymity of the entity associated with the at least one unit of electronic currency, the trustee electronic signature being derived from a blinded representation of the at least one unit of electronic currency such that the authenticity of the trustee electronic signature with respect to the at least one unit of electronic currency can be verified by an entity other than the trustee.

2. The method of claim 1 wherein the information representing the at least one unit of electronic currency is the blinded representation of the at least one unit of electronic currency.

3. The method of claim 1 wherein the information representing at least one unit of electronic currency comprises a random seed for generating at least one blinded unit of electronic currency.

4. The method of claim 3 wherein the information representing the at least one unit of electronic currency further comprises a quantity of desired units of electronic currency for generating at least one blinded unit of electronic currency.

5. The method of claim 1, further comprising:

before the transmitting step, establishing with the trustee the unique identity of the entity associated with the at least one unit of electronic currency using a secret.

6. The method of claim 5 wherein the secret comprises the private key belonging to a public/private key pair.

7. The method of claim 1 wherein the method receiving step comprises receiving from the trustee a trustee token comprising a signature by the trustee on a plurality of blinded units of electronic currency.

8. A system for obtaining certification from a trustee, the trustee being an authority independent of an electronic currency issuing entity, the trustee certifying the revocable anonymity of the identity of an entity and its association with at least one unit of electronic currency, the system comprising:

a transmitter transmitting to a trustee information representing at least one unit of electronic currency and transmitting information uniquely identifying an entity associated with the at least one unit of electronic currency; and a receiver receiving from the trustee a trustee token comprising a trustee electronic signature, the trustee electronic signature certifying the revocable anonymity of the entity associated with the at least one unit of electronic currency, the trustee electronic signature being derived from a blinded representation of the at least one unit of electronic currency such that the authenticity of the trustee electronic signature with respect to the at least one unit of electronic currency can be verified by an entity other than the trustee.

9. A method for generating a trustee certification, the trustee being an authority independent of an electronic currency issuing entity, the trustee certification comprising a trustee token certifying the revocable anonymity of the identity of an entity associated with at least one unit of electronic currency, the method comprising the steps of:

receiving from an entity information representing at least one unit of electronic currency;

receiving from an entity information uniquely identifying the entity associated with the at least one unit of electronic currency;

determining information uniquely identifying the at least one unit of electronic currency;

storing the information representing and uniquely identifying the at least one unit of electronic currency and information uniquely identifying the entity associated with the at least one unit of electronic currency; and generating a trustee token comprising a trustee electronic signature derived from a blinded representation of the at least one unit of electronic currency such that the authenticity of the trustee electronic signature with respect to the at least one unit of electronic currency can be verified by an entity other than the trustee.

10. The method of claim 9 wherein the information representing the at least one unit of electronic currency is a blinded representation of the at least one unit of electronic currency.

11. The method of claim 9 wherein the information representing the at least one unit of electronic currency comprises a random seed.

12. The method of claim 9 wherein the information representing the at least one unit of electronic currency further comprises a quantity of desired units of electronic currency.

13. The method of claim 9 wherein the generating step comprises generating a trustee token using the information representing the at least one unit of electronic currency, said trustee token comprising a signature by a trustee on at least one unit of electronic currency.

14. The method of claim 9 further comprising: after the generating step, transmitting the trustee token to the entity.

15. The method of claim 9 further comprising: before the receiving step, verifying identity of the entity using a secret.

16. The method of claim 9 wherein the generating step comprises: generating a trustee token by using the information representing the at least one unit of electronic currency to generate the blinded representation of the at least one unit of electronic currency; and signing the blinded representation of the at least one unit of electronic currency.

17. The method of claim 16 wherein the signing step comprises signing the blinded representation of the at least one unit of electronic currency using a private key of a public/private key pair.

18. The method of claim 16 wherein the signing step comprises signing the blinded representation of the at least one unit of electronic currency using a MAC (Message Authentication Code).

19. A system for generating a trustee certification, the trustee being an authority independent of an electronic currency issuing entity, the trustee certification comprising a trustee token certifying the revocable anonymity of the identity of an entity associated with at least one unit of electronic currency, the system comprising:

a receiver for receiving from an entity information uniquely identifying the entity associated with the at least one unit of electronic currency;

a currency identifier for determining information uniquely identifying the at least one unit of electronic currency;

data store for storing the information representing and uniquely identifying the at least one unit of electronic currency and storing the information uniquely identifying the entity associated with the at least one unit of electronic currency; and a token generator for generating a trustee token comprising a trustee electronic signature derived from the blinded representation of the at least one unit of electronic currency such that the authenticity of the trustee electronic signature with respect to the at least one unit of electronic currency can be verified by an entity other than the trustee.

20. A method for issuing at least one unit of electronic currency, the method comprising the steps of:

receiving from an entity a blinded representation of at least one unit of electronic currency;

receiving from the entity a trustee token comprising a trustee electronic signature derived from the at least one unit of electronic currency such that the authenticity of the trustee electronic signature with respect to the at least one unit of electronic currency can be verified by an electronic currency issuer;

verifying the authenticity of the trustee electronic signature of the trustee token with respect to the blinded representation of the at least one unit of electronic currency;

deducting an amount from an account associated with the entity; and issuing the blinded representation of the at least one unit of electronic currency by associating and indicating with the blinded representation a value related to the amount deducted from the user's account.

21. The method of claim 20, further comprising:

before the receiving step, verifying identity of the entity using a secret.

22. The method of claim 20 wherein the verifying step comprises calculating a MAC on the blinded representation of the at least one unit of electronic currency.

23. The method of claim 20 wherein the verifying step comprises verifying using a trustee's public key.

24. The method of claim 20 wherein the issuing step comprises signing the blinded representation of the at least one unit of electronic currency.

25. A system for issuing at least one unit of electronic currency, the system comprising:

a receiver for receiving a blinded representation of at least one unit of electronic currency and for receiving a trustee token comprising a trustee electronic signature derived from the at least one unit of electronic currency such that the authenticity of the trustee electronic signature with respect to the at least one unit of electronic currency can be verified by an electronic currency issuer;

a verifier for verifying the authenticity of the trustee electronic signature of the trustee token with respect to the at least one unit of electronic currency;

a withdrawal mechanism for deducting an amount from the account associated with the entity; and an issuer for issuing the at least one unit of electronic currency by associating and indicating with the blinded representation a value related to the amount deducted from an account associated with the entity.

26. A method for receiving at least one unit of electronic currency from an electronic currency issuer using a trustee token, the method comprising the steps of:

transmitting to an electronic currency issuer a blinded representation of at least one unit of electronic currency;

transmitting to an electronic currency issuer a trustee token, said trustee token comprising a trustee electronic signature derived from the blinded representation of the at least one unit of electronic currency such that the authenticity of the trustee electronic signature with respect to the at least one unit of electronic currency can be verified by the electronic currency issuer; and receiving from the electronic currency issuer an electronic currency issuer signature derived from the blinded representation of the at least one unit of electronic currency.

27. A system for receiving at least one unit of electronic currency from an electronic currency issuer using a trustee token, the system comprising:

a transmitter for transmitting to an electronic currency issuer a blinded representation of at least one unit of electronic currency and for transmitting a trustee token, said trustee token comprising a trustee electronic signature derived from the blinded representation of the at least one unit of electronic currency such that the authenticity of the trustee electronic signature with respect to the at least one unit of electronic currency can be verified by the electronic currency issuer; and a receiver for receiving from the electronic currency issuer an electronic currency issuer signature derived from the blinded representation of the at least one unit of electronic currency.

28. A method for obtaining revocably anonymous electronic currency from a bank by using a trustee, the trustee being independent from the bank, the method comprising the steps of:

establishing entity identification with the trustee using a secret;

transmitting to the trustee information representing at least one unit of electronic currency;

receiving from the trustee a trustee token comprising a trustee electronic signature derived from a blinded representation of at least one unit of electronic currency such that the authenticity of the trustee electronic signature with respect to the blinded representation of the at least one unit of electronic currency can be verified by the bank;

transmitting to a bank the blinded representation of the at least one unit of electronic currency;

transmitting to the bank the trustee token; and receiving from the bank a bank electronic signature derived from the blinded representation of the at least one unit of electronic currency.

29. The method of claim 28 further comprising the step of:

transforming the blinded representation to the unblinded representation of the at least one unit of electronic currency; and transmitting the at least one unit of electronic currency to a merchant.

30. A method for determining the association of at least one unit of electronic currency with an entity, the method comprising the steps of:

encrypting information uniquely identifying an entity associated with at least one unit of electronic currency into the unblinded representation of the at least one unit of electronic currency using a secret;

recording the association of the information uniquely identifying an entity to the entity and to both the blinded and unblinded representations of the at least one unit of electronic currency into permanent records;

decrypting the unblinded representation of the at least one unit of electronic currency using a secret to reveal the information uniquely identifying the entity associated with the at least one unit of electronic currency using the permanent records;

matching the decrypted information uniquely identifying an entity with an entity using the permanent records.

31. A method for identifying at least one unit of electronic currency associated with an entity, the method comprising the steps of:

encrypting information uniquely identifying an entity associated with at least one unit of electronic currency into an unblinded representation of the at least one unit of electronic currency using a secret;

recording the association of the information uniquely identifying an entity to the entity and to both the blinded and unblinded representations of the at least one unit of electronic currency into permanent records;

matching an entity to information uniquely identifying the entity that was encrypted inside the unblinded representation of the at least one unit of electronic-currency transmitted to a trustee using the permanent records;

matching the information uniquely identifying an entity encrypted inside at least one unit of electronic currency to the at least one unit of electronic currency transmitted to a trustee using the permanent records; and identifying the matching at least one unit of electronic currency processed by the trustee as the at least one unit of electronic currency associated with the entity.

* * * * *

UNITED STATES PATENT AND TRADEMARK OFFICE
CERTIFICATE OF CORRECTION

PATENT NO. : 6,446,052 B1
DATED : September 3, 2002
INVENTOR(S) : Juels

It is certified that error appears in the above-identified patent and that said Letters Patent is hereby corrected as shown below:

Column 17,
Lines 27 and 29, immediately following "9" insert -- , --.
Line 58, before "data" insert -- a --.

Column 20,
Line 36, delete "-" where it follows "electronic".

Signed and Sealed this

Eleventh Day of March, 2003

JAMES E. ROGAN
*Director of the United States Patent and Trademark Office*